June 18, 1940.  J. E. DUBE  2,205,166

EXPANSION VALVE

Filed July 18, 1936  2 Sheets-Sheet 1

Inventor

John E. Dube.

By Cameron, Kerkam & Sutton
Attorneys

June 18, 1940. J. E. DUBE 2,205,166
EXPANSION VALVE
Filed July 18, 1936 2 Sheets-Sheet 2

Inventor
John E. Dube.
By Cameron, Kerkam & Sutton
Attorneys

Patented June 18, 1940

2,205,166

UNITED STATES PATENT OFFICE 2,205,166

EXPANSION VALVE

John E. Dube, Knoxville, Tenn., assignor to The Fulton Sylphon Company, Knoxville, Tenn., a corporation of Delaware Application July 18, 1936, Serial No. 91,409

13 Claims. (Cl. 236—92)

This invention relates to expansion valves for refrigerating systems.

It is an object of this invention to provide an improved valve of the type referred to, which is simple in construction, inexpensive to manufacture, durable in service, and efficient in operation.

Another object of this invention is to provide a valve of the type referred to which minimizes sticking of the relatively movable parts under the conditions of service.

Another object of this invention is to provide a valve of the type referred to which is so constructed as to minimize leakage when the valve is in closed position.

It has heretofore been proposed to provide an expansion valve for refrigerating systems in which the valve functions to meter the flow of liquid refrigerant, the vaporization of the refrigerant taking place at a point relatively remote from the valve, so that the valve is not subjected to the direct influence of the evaporating refrigerant. It is an object of this invention to provide an improved valve of the type just characterized which minimizes sticking and leakage, and which is also possessed of other important advantages.

Another object of this invention is to provide a valve of the type last characterized wherein the liquid refrigerant is used as a heating medium in order to increase the temperature differential existing between the valve and the evaporator.

Another object of this invention is to provide an expansion valve for refrigerating systems wherein the valve member is provided with balanced expansible and collapsible sealing elements to the end that the pressure of the liquid at the inlet side of the valve shall not exert an unbalanced pressure on the valve member due to the use of flexible walls as sealing elements.

Another object of this invention is to provide an automatic expansion valve for refrigerating systems which is possessed of the advantages hereinbefore referred to.

Another object of this invention is to provide a thermostatic expansion valve for refrigerating systems which shall be possessed of the advantages hereinbefore referred to.

Other objects will appear as the description of the invention proceeds.

The invention is capable of receiving a variety of mechanical expressions, two of which are shown on the accompanying drawings, but it is to be expressly understood that the drawings are for purposes of illustration only, and are not to be construed as a definition of the limits of the invention, reference being had to the appended claims for that purpose.

Referring in detail to the drawings, wherein the same reference characters are employed to designate corresponding parts in the several figures.

Figure 1:
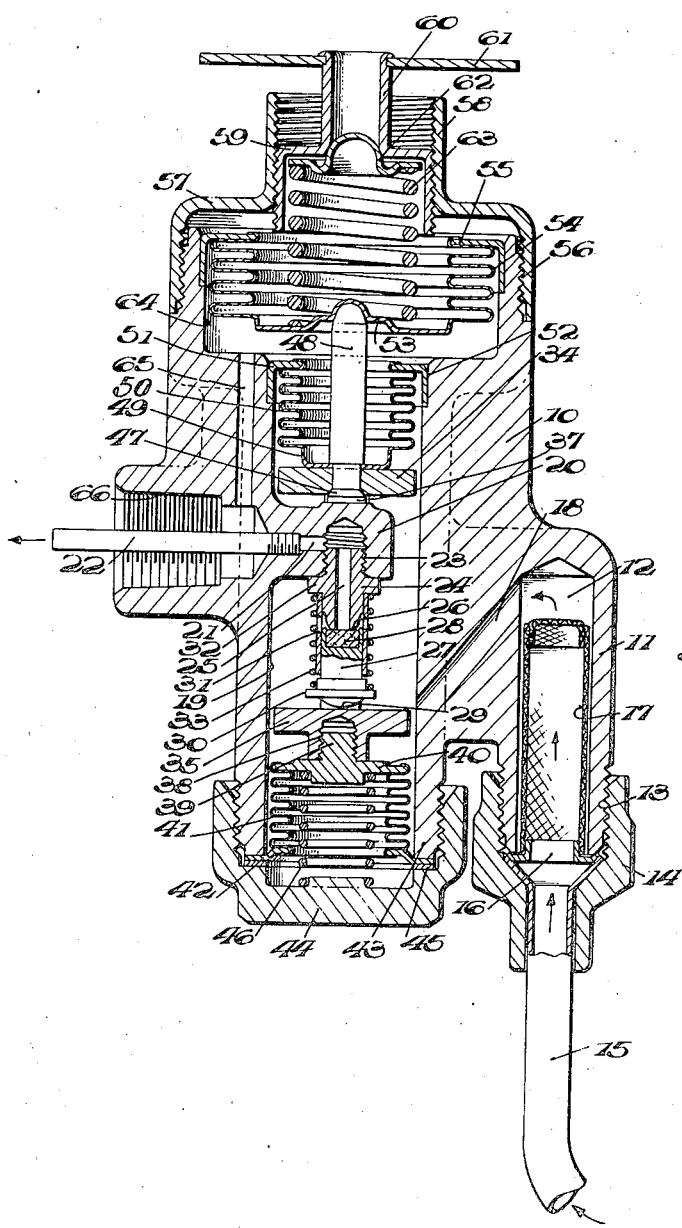
Fig. 1 is an axial section of an automatic expansion valve embodying the present invention.
Figure 2:
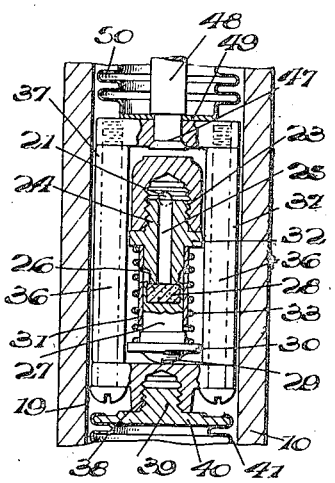
Fig. 2 is a fragmentary section taken at right angles to the section of Fig. 1 to more clearly illustrate the yoke construction.

Referring first to the embodiments of Figs. 1 and 2, a valve casing 10, of any suitable size, construction and material, is provided with a hollow boss 11 having therein a filter chamber 12. The extremity of said boss 11 is threaded as shown at 13 and an interiorly threaded nipple 14 secures thereto an inlet pipe 15 of any suitable character, but any other suitable form of attachment for the inlet pipe may be provided, if preferred. Mounted within the chamber 12 in any suitable way, as by a flanged collar 16, is a strainer or filter 17 of any suitable size, construction and material.

Leading from the filter chamber 12 is a duct 18 which, at its opposite end, communicates with the inlet chamber 19 containing the valve mechanism hereinafter described. Projecting into said chamber 19 is a nipple 20 containing a passage 21 with which communicates a pipe 22 leading to the evaporator. Nipple 20 has an interiorly threaded bore 23 which receives a valve seat member 24 containing a passage 25 extending from the valve seat 26 to the passage 21.

Cooperating with the valve seat 26 is a valve member 27 of any suitable construction and material, but preferably provided with a block or plug 28 of yieldable non-metallic material for contact with the valve seat 26. Said block or plug 28 may be held in position in any suitable way, as by swaging over the peripheral wall of the cup-shaped cavity in which said block or plug is received. While, as respects the present invention, said block or plug 28 may be made of any suitable material, preferably non-metallic so as to be non-corrosive, said block or plug is preferably composed of a material that will be penetrated by the valve seat 26 as disclosed and claimed in my copending application Serial No. 91,410, filed of even date and entitled Expansion valves. Valve seat member 27 at its opposite extremity is provided with a spherical surface 29, and adjacent thereto is a spring retaining flange 30. Valve member 27 is guided in its movements to and from the valve seat 26 by an apertured sleeve 31 mounted on the valve seat member 24 in any suitable way, and reacting between said flange 30 and a flange 32 on the valve seat member is a coil spring 33 which normally urges the valve member away from its seat and into engagement with the yoke to be described.

Embracing the nipple 20 is a yoke here shown as composed of plates 34 and 35 connected in any suitable way as by a pair of bolts 36 (see Fig. 2) having their heads in engagement with the plate 35 and their opposite ends threaded into tapped holes in the plate 34. Spacing sleeves 37 surround said bolts and predetermine the spacing of the plates 34 and 35.

The yoke as heretofore disclosed is rigidly connected at its opposite ends to balanced expansible and collapsible sealing elements which close the opposite extremities of the chamber 19. To this end, as shown, plate 35 has an interiorly threaded socket 38 which receives the threaded boss 39 on the movable end wall 40 of an expansible and collapsible, deeply corrugated, tubular metal wall or bellows 41 having one end secured in any suitable way to said movable end wall 40 and its opposite end secured in any suitable way to a flange 42 which is clamped to the threaded extremity 43 of the casing 10 by the interiorly threaded cap 44, suitable packing being indicated at 45. Interposed between the movable end wall and the cap 44 is a coil spring 46 which normally urges the yoke, and the valve member held in contact therewith by the coil spring 33, toward the closed position of the valve.

Plate 34 has suitably attached thereto, as by the head 47 of the stem 48, the movable end wall 49 of a second expansible and collapsible, deeply corrugated, tubular metal wall or bellows 50, here shown as formed integrally with said movable end wall and having its opposite end attached in any suitable way to a flanged element 51 which may be soldered or otherwise suitably secured in a recess 52 at the extremity of the chamber 19. The effective areas of the bellows 41 and 50 are made equal so that the pressure in the chamber 19 on the flexible sealing elements constituted thereby is balanced, exerting no bias on the valve member.

Stem 48, which is secured to the end wall 49 of the bellows 50, projects exteriorly of said bellows and at its outer extremity is engaged with or suitably attached to the movable end wall 53 of an expansible and collapsible, deeply corrugated, tubular metal wall or bellows 54, which is of materially larger area than the bellows 41 and 50 and which, as here shown, has one end formed integrally with the movable end wall 53, while its opposite end is attached in any suitable way to a flanged element 55 soldered or otherwise suitably sealed in a recess at the extremity of the valve housing 10. The end of the valve housing is threaded at 56 and carries an interiorly threaded cap 57 having a tubular extension 58 that is also interiorly threaded. Threadedly received within said extension 58 is a tubular element 59 that has a portion 60 of reduced diameter extending to the exterior of the cap 58, where said element has attached thereto in any suitable way an adjusting element or hand grasp 61. Within the element 59 is a spring seat 62 between which and the movable end wall 53 or bellows 54 is a coiled loading spring 63.

The bellows 54 is disposed in a chamber 64 which communicates through duct 65 with a pipe leading to the evaporator and connected to the valve housing in any suitable way, as by the threaded joint indicated at 66. Therefore, the pressure in the evaporator is transmitted to the movable end wall 53 of the bellows 54, and the position of the valve member is determined by the pressure in the evaporator, as transmitted to the effective area of the bellows 54, and by the tension of the springs 63 and 46. By predetermining the effective area of the bellows 54 and the tension of the springs 46 and 63 the pressures at which valve member 27 shall open and close can be nicely predetermined, and these pressures may be varied by rotating the element 59 to advance or withdraw the same with respect to the cap 58 to variously tension the spring 63.

The liquid refrigerant entering the chamber 19 through pipe 15, inlet chamber 12 and duct 18 is metered by the valve member 27 and flows as a liquid to and through the pipe 22. As the vaporization takes place at a point remote from the valve, the latter is merely called upon to control the flow of the refrigerant, and therefore it is relieved of the chilling which takes place if the vaporization occurs immediately after passage through the valve port, thereby avoiding sticking at the valve due to the congealing of the lubricant. Moreover, the wear on the valve port is materially reduced owing to the fact that the valve does not have to control the flow of high-velocity expanding gas.

The valve member 27, normally urged into contact with the yoke by the spring 33, has only point contact with said yoke because of the spherical surface of the contact between said valve member and yoke, and therefore the valve member may swivel or pivot to assume its proper position for tightly closing the valve port. At the same time it is properly guided in its movements into and out of contact with the valve seat by the surrounding sleeve 31. The chamber 19 at the inlet side of the valve is hermetically sealed by the flexible walls provided by the bellows 41 and 50, thereby eliminating relatively sliding parts or stuffing boxes at which sticking may occur, while the use of such flexible sealing elements does not impose any bias on the valve member because the pressure of the liquid refrigerant at the inlet side of the valve is exactly balanced on the flexible sealing elements. Hence there is no unbalanced pressure acting on the yoke which is rigidly connected with said sealing elements to move said yoke in one direction or the other. The valve member, which is not positively connected to the yoke but merely held in point contact therewith by the spring 33, may thus be characterized as a freely floating valve which may assume a position to prevent leakage and at the same time the causes of sticking have been avoided.

Figure 3:
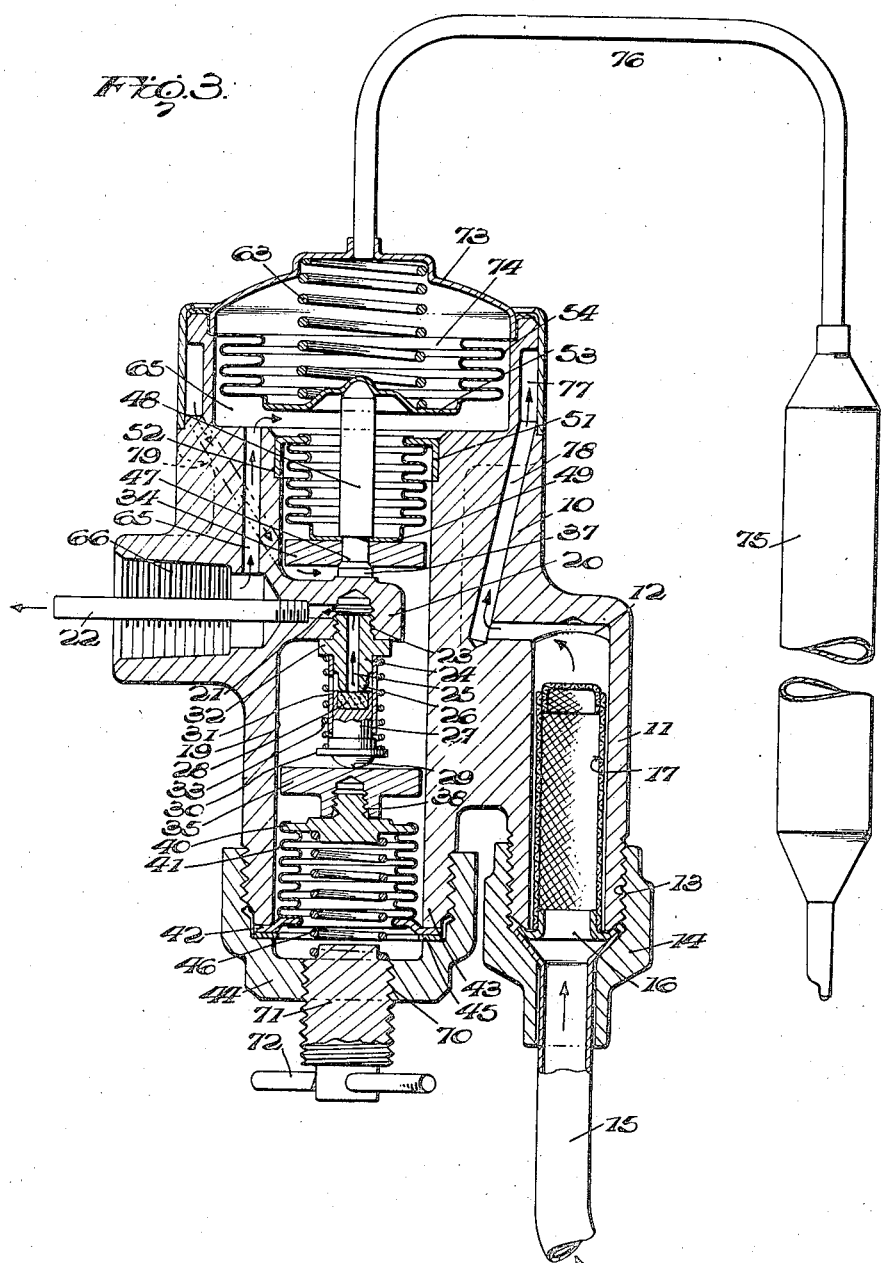
Fig. 3 is an axial section of a thermostatic expansion valve embodying the present invention.

While the embodiment of the invention as so far described has been concerned with an automatic expansion valve, the invention may also be embodied in a thermostatic expansion valve. The embodiment of Fig. 3 shows the present invention applied to a thermostatic expansion valve which, as respects its major features, is the same as that illustrated in the embodiment of Fig. 1, the corresponding parts being designated by the same reference characters. In this embodiment the adjustment is effected through the bellows 41, and to this end the cap 44 is provided with a threaded opening 70 which receives a threaded plug 71 on which is seated the end of the spring 46. Any suitable means 72 applied to the plug 71 may be used for rotating said plug and thereby varying the tension of the spring 46. At the opposite end of the valve housing 10 the bellows 54 has sealed thereto in any suitable way a rigid end wall 73 which, with said bellows 54, provides the expansible and collapsible vessel 74 constituting the motor element of a thermostat, here shown as provided with a bulb 75 connected with said vessel 74 through a tube 76 of any suitable character. As in the embodiment of Fig. 1, the movement of the valve is determined by the evaporator pressure on the movable end wall 53 and the tension of the springs 63 and 46, but in this embodiment supplemented by the thermostatic pressure in the vessel 74, and the manual adjustment of one of the springs of the system has in this case been transferred from the spring 63, as in Fig. 1, to the spring 46, as in Fig. 3. Otherwise, the device possesses the same advantages and operates in the same way with the exception that a thermostatic control is imposed on the system.

The embodiment of Fig. 3 also illustrates another feature of the present invention which may be incorporated in other embodiments, to wit, the use of the liquid refrigerant as a heating medium for increasing the temperature differential between the valve and the evaporator. In this embodiment the heating effect of the liquid refrigerant is applied to the thermostatic chamber 74, and to this end the valve housing has suitably formed therein an annular chamber 77 which surrounds the thermostatic chamber 74 and which communicates with the filter chamber 12 through duct 78 and with the inlet chamber 19 through duct 79. The liquid refrigerant entering the chamber 19 from the inlet chamber 12 is thus caused to flow through the chamber 77 where its relatively warm temperature, as compared with the temperature of the evaporator, is imparted to the thermostatic vessel 74.

With both embodiments of the invention, in respect to the use of liquid refrigerant only at the valve, frosting at the valve is eliminated, and therefore it has been found unnecessary to use either the usual rubber cap over the adjustment means 59, 60, 61 in the embodiment of Fig. 1, to prevent the formation of ice in the bellows 54, or the usual Bakelite insulation around the motor element 74 of the thermostat, in the embodiment of Fig. 3.

It will therefore be perceived that the present invention provides an expansion valve for a refrigerating system which may be embodied in either automatic expansion valves or thermostatic expansion valves and which by reason of its novel construction minimizes sticking and leaking, and at the same time provides a highly efficient and simply constructed expansion valve which is possessed of many important advantages. While the embodiments of the invention illustrated on the drawings have been descvribed with considerable particularity, it is to be expressly understood that the invention is not restricted thereto, as the same is capable of receiving a variety of mechanical expressions, some of which will now readily suggest themselves to those skilled in the art, while changes may be made in the details of construction, arrangement, proportion, material, etc., and certain features used without other features, without departing from the spirit of this invention. Reference is therefore to be had to the appended claims for a definition of said invention.

What is claimed is:

1. In a thermostatic expansion valve for refrigerating systems, the combination of a valve casing, an inlet chamber therein, means for conducting liquid refrigerant to and from said inlet chamber, a ported valve seat member in said inlet chamber, a valve member cooperating with said valve seat member and disposed in said inlet chamber, a yoke in said inlet chamber operatively associated with said valve member, a pair of flexible walls of substantially equal effective area attached to the opposite ends of said yoke and subjected to the pressure in said inlet chamber for sealing the opposite ends of said chamber, a thermostat operatively connected to said yoke, and means for leading the liquid refrigerant into heat interchanging relationship with said thermostat to maintain the temperature at said valve materially above the temperature in the evaporator.

2. In an expansion valve for refrigerating systems, the combination of a valve casing, an inlet chamber therein, means for conducting liquid refrigerant to and from said chamber, a ported valve seat member in said inlet chamber, a valve member cooperating with said valve seat member and disposed in said inlet chamber, a yoke in said inlet chamber operatively associated with said valve member, flexible walls of substantially equal effective area attached to the opposite ends of said yoke and subjected to the pressure in said inlet chamber for sealing the opposite ends of said chamber, means operatively connected to said yoke for operating the same to open and close said valve, and means for conducting the liquid refrigerant into heat interchanging relationship with said last named means for maintaining the temperature thereat materially above the temperature in the evaporator.

3. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall.

4. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, said valve operating means including a member on which said valve member is pivotally mounted, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall.

5. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, said valve operating means including a yoke extending on opposite sides of said valve seat member, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall, and said last two flexible walls being connected to said yoke at the portions thereof extending on opposite sides of said valve seat member.

6. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, said valve operating means including a yoke extending on opposite sides of said valve seat member and with which said valve member has pivotal engagement, a guide for said valve member carried by said seat member, resilient means for maintaining said valve member in contact with said yoke, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall, and said last two flexible walls being connected to said yoke at the portions thereof extending on opposite sides of said valve seat member.

7. In an expansion valve for refrigerating systems, the combination of a valve casing, an inlet chamber in said casing, means in said chamber providing a ported valve seat member, a valve member in said inlet chamber for co-operation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, resilient means including a spring cooperating with said flexible wall for predetermining the actuation thereby of said valve operating means, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall.

8. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, resilient means including a spring cooperating with said flexible wall for predetermining the actuation thereby of said valve operating means, means extending to the exterior of said casing for varying the tension of said spring, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall.

9. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, thermostatic means associated with said flexible wall for actuating said valve actuating means, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall.

10. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, said means including a yoke on which said valve member is pivotally mounted, means for retaining said valve member in alignment with said valve port, a flexible wall associated with said valve operating means for sealing said inlet chamber from said second chamber, said last named wall being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall.

11. In an expansion valve for refrigerating systems, the combination of a valve casing, an inlet chamber in said casing, means in said chamber providing a ported valve seat member, a valve member in said inlet chamber for coopoeration with said valve seat, means for leading a liquid refrigerant to said inlet chamber, means communicating with the port of said valve seat for leading the liquid refrigerant therefrom to the evaporator, a second chamber in said casing in communication with the evaporator, a flexible wall in said second chamber subjected to the pressure in the evaporator, valve operating means operatively connecting said flexible wall with said valve member, resilient means including a spring cooperating with said flexible wall for predetermining the actuation thereby of said valve operating means, a flexible wall associated with said valve operating means for sealing said inlet chamber from said chamber, said last named wall being subjected to the pressure of the liquid refrigerant in said inlet chamber, a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall, and resilient means cooperating with said second flexible wall and coacting with said first named resilient means to predetermine the actuation of said valve operating means.

12. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, valve operating means operatively connected with said valve member, means in said second chamber aligned with and operatively connected to said valve operating means, a flexible wall associated with said valve operating means for sealing said inlet chamber from said second chamber, said last named means being subjected to the pressure of the liquid refrigerant in said inlet chamber, and a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall.

13. In an expansion valve for refrigerating systems, the combination of a valve casing, an inlet chamber in said casing, means in said chamber providing a ported valve seat member, a valve member in said inlet chamber for cooperation with said valve seat, means for leading a liquid refrigerant to said inlet chamber, means communicating with the port of said valve seat for leading the liquid refrigerant therefrom to the evaporator, a second chamber in said casing in communication with the evaporator, valve operating means operatively connected with said valve member, means in said second chamber aligned with and operatively connected to said valve operating means, a flexible wall associated with said valve operating means for sealing said inlet chamber from said second chamber, said last named means being subjected to the pressure of the liquid refrigerant in said inlet chamber, a second flexible wall associated with said valve operating means for sealing the opposite end of said inlet chamber and preventing fluctuations of pressure in the liquid refrigerant in said inlet chamber from varying the position of said valve member, said second flexible wall being subjected to the pressure of the liquid refrigerant in said inlet chamber and having substantially the same effective area as said sealing wall, said last two flexible walls being axially aligned with said means in said second chamber and cooperating with said valve operating means at opposite sides of said valve and valve seat members.

JOHN E. DUBE.